(12) United States Patent
Brugier et al.

(10) Patent No.: US 7,808,727 B2
(45) Date of Patent: Oct. 5, 2010

(54) CHANGER OF SPHERICAL FIELD

(75) Inventors: Anthony Brugier, Paris (FR); Rodolphe Pierrois, Paris (FR)

(73) Assignee: Sagem Defense Sécurité, Paris (FR)

( * ) Notice: Subject to any disclaimer, the term of this patent is extended or adjusted under 35 U.S.C. 154(b) by 904 days.

(21) Appl. No.: 11/567,467

(22) Filed: Dec. 6, 2006

(65) Prior Publication Data

US 2007/0154196 A1 Jul. 5, 2007

(30) Foreign Application Priority Data

Dec. 6, 2005 (FR) .................................. 05 12369

(51) Int. Cl.
*G02B 7/02* (2006.01)
(52) U.S. Cl. .................. 359/821; 359/823; 359/813
(58) Field of Classification Search ................ 359/811, 359/813, 819, 822–824
See application file for complete search history.

(56) References Cited

U.S. PATENT DOCUMENTS

| 4,829,331 A * | 5/1989 | Aihara ........................ 396/121 |
| 5,726,814 A * | 3/1998 | Lidwell ....................... 359/821 |
| 2004/0114221 A1 | 6/2004 | Piontkowski | |
| 2005/0117208 A1 | 6/2005 | Schnitzler et al. | |

FOREIGN PATENT DOCUMENTS

FR 2 727 527 A1 5/1996

OTHER PUBLICATIONS

Preliminary Search Report for French Patent Application No. 05 12369, dated Sep. 25, 2006.

* cited by examiner

*Primary Examiner*—Ricky L Mack
*Assistant Examiner*—Brandi N Thomas
(74) *Attorney, Agent, or Firm*—Marshall, Gerstein & Borun LLP

(57) ABSTRACT

A field changer device (4) comprising:
  a rotary magazine (5) of spherical general shape mounted so as to rotate about a rotation axis (R) coincident with an axis of symmetry of the magazine (5), which is inclined to a fixed principal optical axis (X); and
  at least three optical channels (A, B, C) provided in said magazine (5) and having concurrent respective optical axes (XA, XB, XC) inclined at the same angle ($\alpha$) to the rotation axis (R),
  it being possible for said magazine (5) to rotate about its rotation axis (R) through predetermined rotation angles ($\beta_1, \beta_2, \beta_3$) in order to place each of the optical channels (A, B, C) alternately along the principal optical axis (X), the optical channels (A, B, C) being arranged in the magazine (5) in such a way that at least two of the rotation angles ($\beta_1, \beta_2, \beta_3$) of the magazine (5) are different.

12 Claims, 6 Drawing Sheets

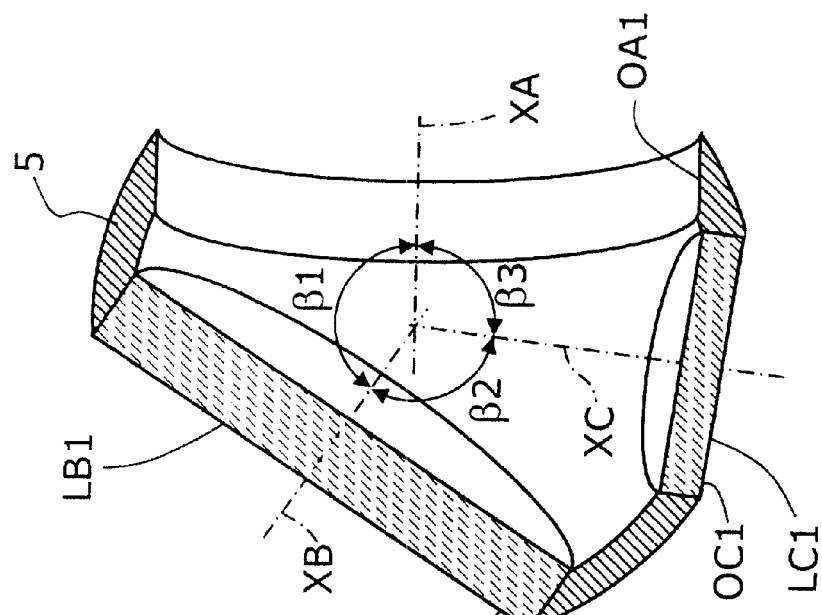
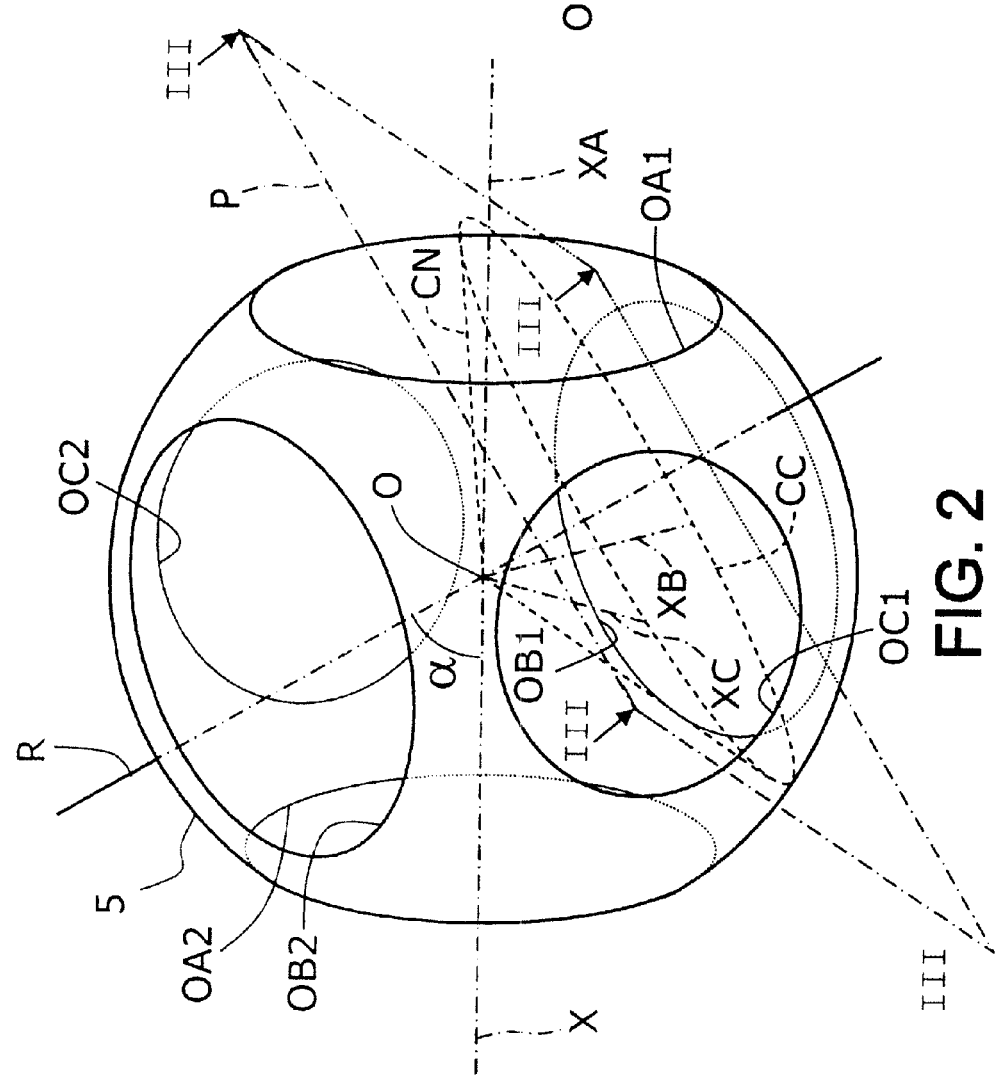
FIG. 2
FIG. 3

CHANGER OF SPHERICAL FIELD

FIELD OF THE INVENTION

The invention relates to an optical field changer or drum device.

Such devices are found in many applications. Certain microscopes and telescopes are equipped therewith. In the field of air navigation, it is also customary to use cameras (for example thermal cameras) equipped with field changer devices.

BACKGROUND OF THE INVENTION

A field changer device (hereafter called more simply "field changer") generally comprises a rotary magazine in which several optical channels having different magnifications are provided.

Each optical channel has its own optical axis, which, by rotation of the magazine, is brought into coincidence with a fixed optical axis corresponding to the direction of observation.

In certain field changers (especially those with which microscopes are equipped), the magazine takes the form of a disk which is rotated about an axis coincident with its axis of symmetry, and on which disk several objectives are mounted, the individual optical axes of which are inclined to the rotation axis. Switching from one objective to its neighbor is performed by rotating the magazine through a predetermined angle corresponding to the angular difference between the projections, in a plane perpendicular to the rotation axis, of the individual optical axes of the objectives.

Owing to the various sizes of the objectives, the mass of such a changer is not balanced, the rotation of the magazine displacing the center of gravity of the field changer along a circle which is centered on the rotation axis, the relatively large diameter of which depends on the respective masses of the objectives.

This type of field changer is satisfactory for laboratory optical equipment, the choice of which is not determined by mass and balancing constraints.

However, this type of changer is especially unsuitable for optical equipment of large dimensions (for example in the field of telescopes), in which the masses of the optics are large and in which imbalances may result in alignment defects, making them more sensitive to vibratory environments that are often severe in the conditions of use of such equipment (shocks, vibrations, accelerations, etc.), or for air navigation assistance devices, in particular in the military field, where the onboard mass must be minimized and where the sighting precision of the changer depends on it being well-balanced.

Efforts have already been made toward better balancing of the changer. The reader may refer in particular to document FR 2 727 527, or to its equivalent U.S. Pat. No. 5,726,814, which describes a field changer having a cubic magazine, carrying three optical components mounted on faces of the cube and alternately brought into alignment with the optical axis by rotating the magazine through an angle of 120° about a diagonal of the cube.

Although this device marks real progress in terms of balancing, it does however have a number of drawbacks:

firstly, since each optical component occupies a pair of opposed faces of the cube, this can carry, at most, only three optical channels; and secondly, the overall size of the magazine corresponds to a sphere, the diameter of which is equal to the length of its diagonal, that is to say about 1.7 times a side of the cube, which is necessarily greater than the diameter of the lens of the bulkiest optical component. In other words, the size of the magazine appears to be difficult to control.

SUMMARY OF THE INVENTION

It is an object of the invention in particular to remedy these drawbacks, by proposing a field changer optimized in terms of mass, size and balancing.

For this purpose, the invention proposes a field changer device comprising:

a rotary magazine of spherical general shape mounted so as to rotate about a rotation axis coincident with an axis of symmetry of the magazine, which is inclined to a fixed principal optical axis; and at least three optical channels provided in said magazine and having concurrent respective optical axes inclined at the same angle to the rotation axis, it being possible for said magazine to rotate about its rotation axis through predetermined rotation angles in order to place each of the optical channels alternately along the principal optical axis, the optical channels being arranged in the magazine in such a way that at least two of the rotation angles of the magazine are different.

According to one embodiment, at least one of the rotation angles of the magazine is different from 120°. The rotation angles are, for example, approximately 140°, 120°, 100°.

Each optical channel may include at least one bore produced in the magazine, and two of said bores comprise, for example, at least one lens mounted in a bore.

According to one embodiment, each optical channel comprises a pair of diametrically opposed bores produced in the magazine and in that at least two of the optical channels comprise a set of lenses mounted in two diametrically opposed bores, respectively.

The angle of inclination of the rotation axis of the magazine to the principal optical axis is preferably between 55° and 65°. According to one particular embodiment, this angle is 59.5°.

In general, these systems comprise three fields:

a wide field (for example around 30° to 55°) often called a navigation field, as it has a "vision" of the environment similar to vision with the naked eye and allows the user to carry out his flying and navigation functions at night;

an intermediate field (for example around 5° to 10°) allowing targets or objectives to be detected and located; and finally a narrow field (for example around 0.5° to 2°) allowing target recognition and identification.

Typically, the optical channels may define for example fields with respective angular apertures of about 1°, 10° and 40°.

Furthermore, an additional optical field may exist, which is intended for calibrating the detector or for sending, to the detector (a linear array or matrix sensor), a uniform temperature image so as to measure all of the detection inhomogeneities as a function of the field and in this way be able to compensate for them in order not to disturb the image that it is desired to acquire.

The invention also proposes a camera comprising, placed coaxially on the optical axis, a front optical module, a field changer device as described above, a rear optical module, which includes a focusing element, and a detection module.

BRIEF DESCRIPTION OF THE DRAWINGS

Other objects and advantages of the invention will become apparent in the light of the following description given with reference to the appended drawings in which:

FIG. 2 is a perspective front view showing just the magazine of the field changer device of FIG. 1;

FIG. 3 is a sectional view showing the magazine of FIG. 2 in the plane of section III-III.

DETAILED DESCRIPTION OF THE INVENTION

Figure 1:
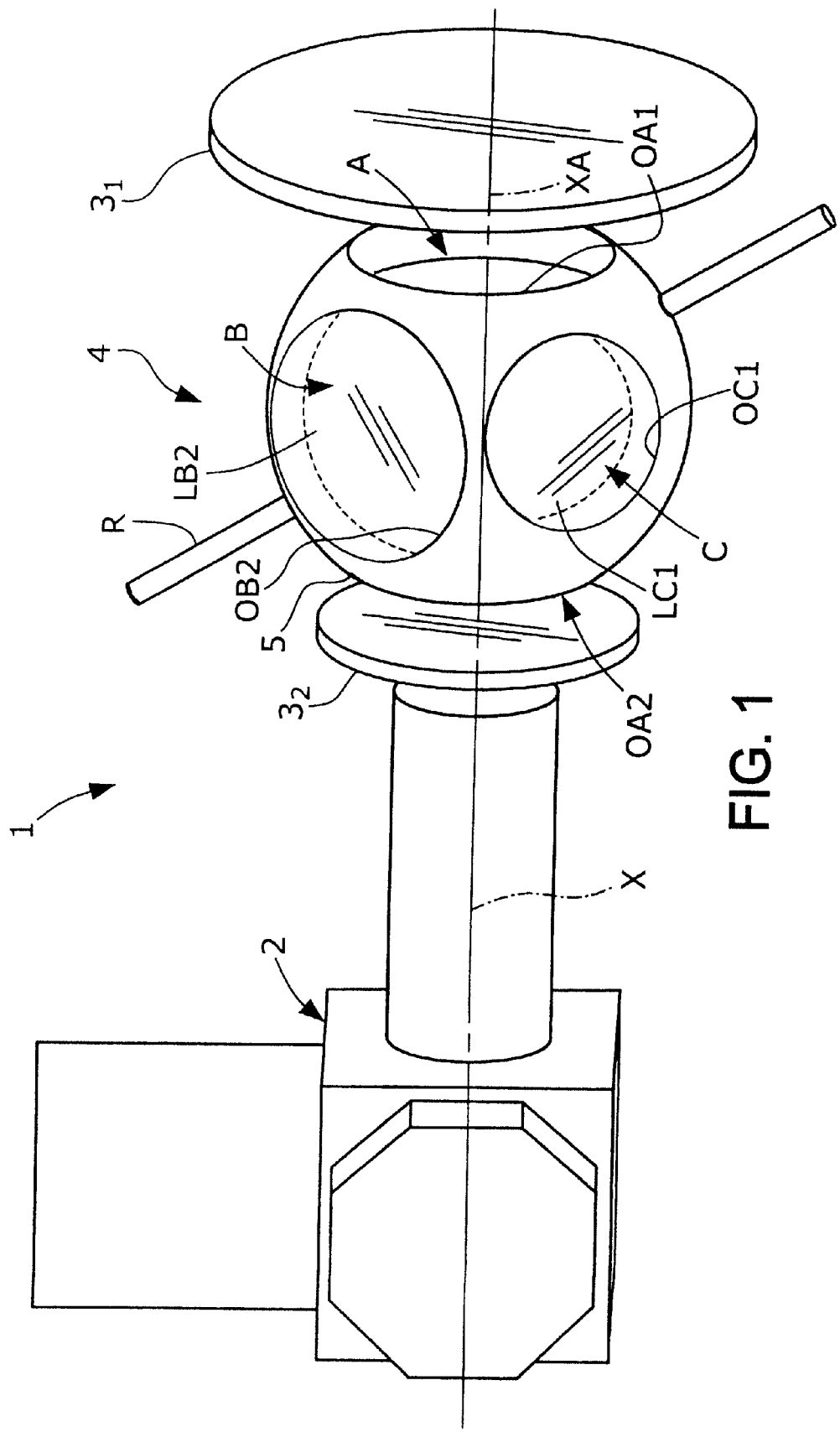
FIG. 1 is a partial perspective front view showing a camera equipped with a field changer device according to the invention.

FIG. 1 shows a camera 1 comprising, mounted in a casing (not shown):
- a front optical module $3_1$, which typically may comprise at least one large-diameter lens;
- a field changer device 4 for varying the magnification capability of the camera 1;
- a rear optical module comprising a focusing element $3_2$; and
- a detection module 2, all these components being based coaxially with respect to an optical axis X.

The field changer device 4, hereafter simply referred to as the field changer, or changer, comprises a rotary magazine 5 of spherical general shape, mounted so as to rotate with respect to the casing of the camera 1 about a rotation axis R coincident with an axis of symmetry of revolution of the sphere and inclined to the principal optical axis X at a predetermined angle α. This angle is strictly between 0° and 90°. More precisely, it is preferably between 55° and 65° and, according to one particular embodiment, it is 59.5°.

This changer 4 further comprises several, typically three, optical channels, illustrated as A, B, C respectively, placed in the magazine, which in practice takes the form of a hollow sphere made of a light alloy based on aluminum or magnesium.

Each optical channel A, B, C comprises a pair of diametrically opposed cylindrical (or frustoconical) apertures made in the magazine, referenced OA1, and OA2 in the case of channel A, OB1 and OB2 in the case of channel B and OC1 and OC2 in the case of channel C, respectively, in which channels, as will be seen later, lenses may be mounted.

The two apertures of any one channel (for example OA1 and OA2) are centered on a common axis, called the specific optical axis of the corresponding optical channel. The respective optical axes of the three channels, references XA, XB and XC respectively, are concurrent with the geometrical center O of the magazine 5.

The optical axes XA, XB, XC are inclined at the same angle to the rotation axis of the magazine. This angle is equal to the angle a of inclination of the rotation axis R to the principal optical axis X.

In other words, the optical axis XA, XB, XC are distributed over a cone of revolution CN centered on the rotation axis R of the magazine 5, the apex of which is coincident with the geometrical center of the magazine 5 and the apex half-angle of which is equal to the angle α (59.5° in the preferred embodiment).

In this way, by rotating the magazine 5 about its rotation axis R, it is possible to bring each of the specific axes XA, XB, XC of the channels A, B, C into coincidence with the principal optical axis X. The rotation angles of the magazine 5 about its axis R, for changing the field, are predetermined and depend on the arrangement of the channels A, B, C in the magazine 5.

This arrangement is not symmetrical, that is to say at least two of the angles β1, β2 and β3, which separate the projections of the specific optical axes XA, XB, XC in a plane P perpendicular to the rotation axis R (these angles are equal to the rotation angles of the magazine 5), are different (cf. FIG. 3).

According to one embodiment, the angle β1 separating the projection in P of the optical axis XA of the channel A from the projection of the optical axis XB of the channel B is about 140°, and the angle β2 separating the projection of the optical axis XB of the channel B from the projection of optical axis XC of the channel C is about 120°. Complementarily, it follows that the angle β3 separating the projection of the optical axis XC of the channel C from the projection of the optical axis XA of the channel A is 100°.

The purpose of this asymmetrical arrangement of the optical channels A, B, C is to minimize the outside diameter of the magazine 5 so as to minimize the weight (and therefore the inertia) of the changer 4.

Each optical channel defined, in combination with the objective lens, a particular field of view, the aperture angle of which depends on the presence or absence of lenses and on their magnifying power.

The choice of the fields depends on the use to which the camera 1 is intended. For use in combat navigation assistance in helicopters, it may be appropriate for the three optical axes A, B, C of the envisaged example to be chosen in the following manner:
- in channel A, a narrow field, for example having an angular aperture of about 0.5° to 2°, typically about 1°, corresponding to a high magnification power and intended for tracking;
- in channel B, an intermediate field, for example having an angular aperture of about 5° to 10°, typically about 10°, corresponding to an intermediate magnification power and intended for detection; and, finally
- in channel C, a wide field, for example having an angular aperture of about 30° to 55°, typically about 40°, corresponding to a low (wide-angle) magnification power and intended for normal navigation.

Channels B and C are both equipped with a pair of lenses LB1 and LB2 on the one hand and LC1 and LC2 on the other, constituting an a focal optical system, whereas channel A does not have a lens, the beam F transmitted by the objective lens 3 passing freely, that is to say without being refracted, through the corresponding apertures OA1, OA2.

To illustrate the above, FIG. 2 shows a hollow sphere (with no thickness) in which holes of circular outline are made, representing the bores OA1, OA2, OB1, OB2, OC1, OC2 of each of the channels A, B, C. The aforementioned cone of revolution CN is shown by the dotted lines. This cone, the apex of which is coincident with the center O of the sphere, bears on a circle CC circumscribing the triangle joining the centers C1, C2, C3 of the three adjacent apertures OA1, OB1, OC1 that are located on a semisphere and corresponding to the three channels A, B and C respectively. This circle CC lies in a plane P, which constitutes the plane of section III-III in which the field changer is shown in FIG. 3.

A method of constructing the changer 1 that has just been described will now be proposed.

Having determined the field corresponding to channel A, the diameter of the apertures OA1, OA2 to be produced in the sphere is calculated so that the useful beam transmitted by the objective lens 3 can pass freely through the magazine 5. The diameter of the spherical magazine 5 is then fixed— this diameter must be sufficient to allow the apertures OA1, OA2 of channel A to be produced while leaving space free on the magazine 5 available for producing the other apertures OB1, OB2, OC1, OC2.

Figure 4:
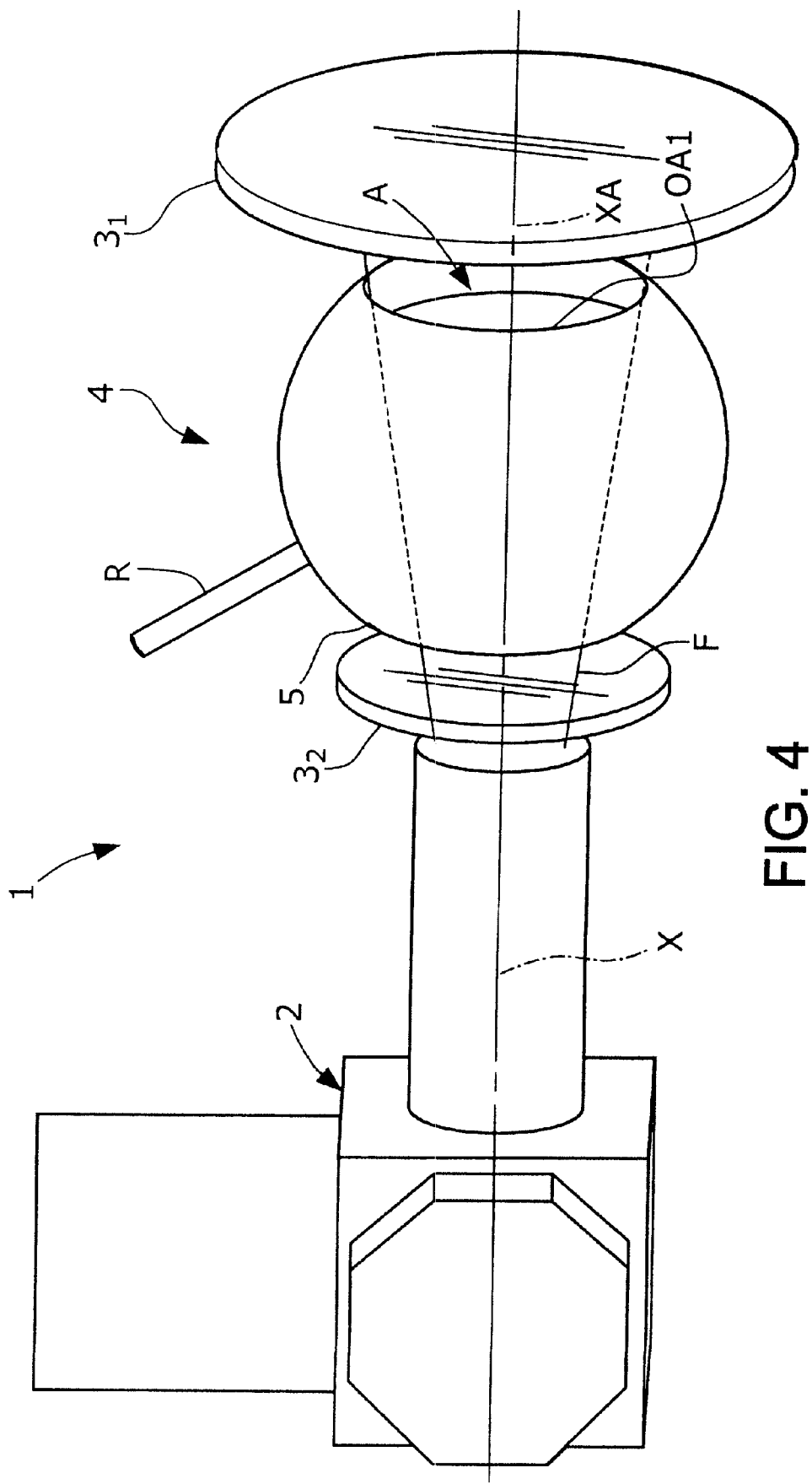
FIGS. 4 to 7 are views similar to FIG. 1, showing the steps in the construction of the field changer.

The diametrically opposed openings OA1, OA2, corresponding to channel A, are then drilled jointly in the sphere (FIG. 4).

The axis XA of channel A, defined by the straight line joining the center of the apertures OA1, OA2, is then placed on the principal optical axis X, and then the rotation axis R of the magazine 5 is fixed in such a way that it does not meet the apertures OA1, OA2 (FIG. 4).

Figure 5:
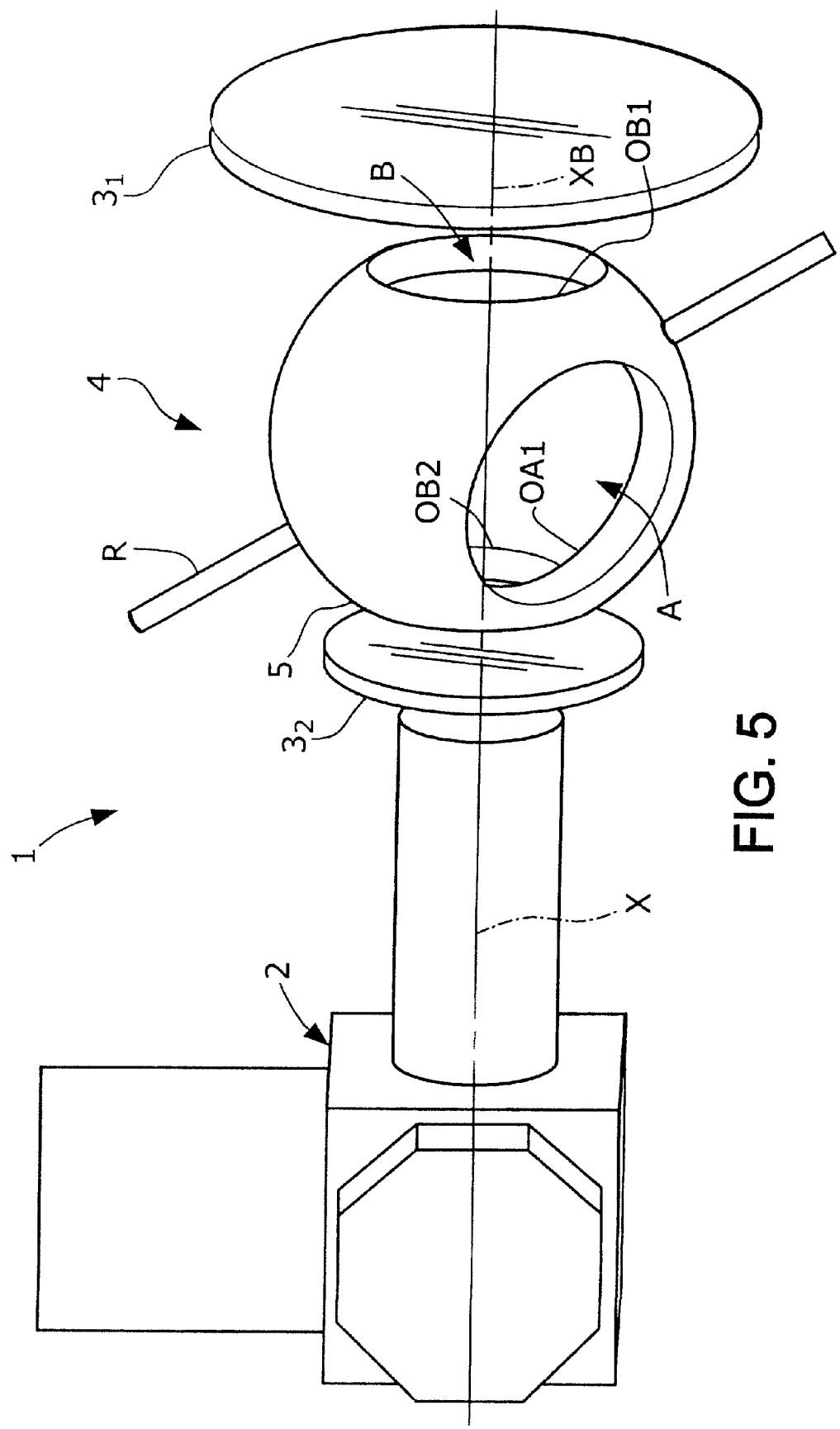

Having defined the diameter of the lenses LB1, LB2 of channel B, the sphere is rotated about its rotation axis R until there exists, on said sphere, about the principal optical axis X, sufficient space for making, along this axis X, two diametrically opposed bores OB1, OB2 of a diameter corresponding to the diameter of the lenses LB1, LB2 of channel B, without these bores OB1, OB2 encroaching on the bores OA1, OA2 of channel A that have already been produced (FIG. 5).

Figure 6:
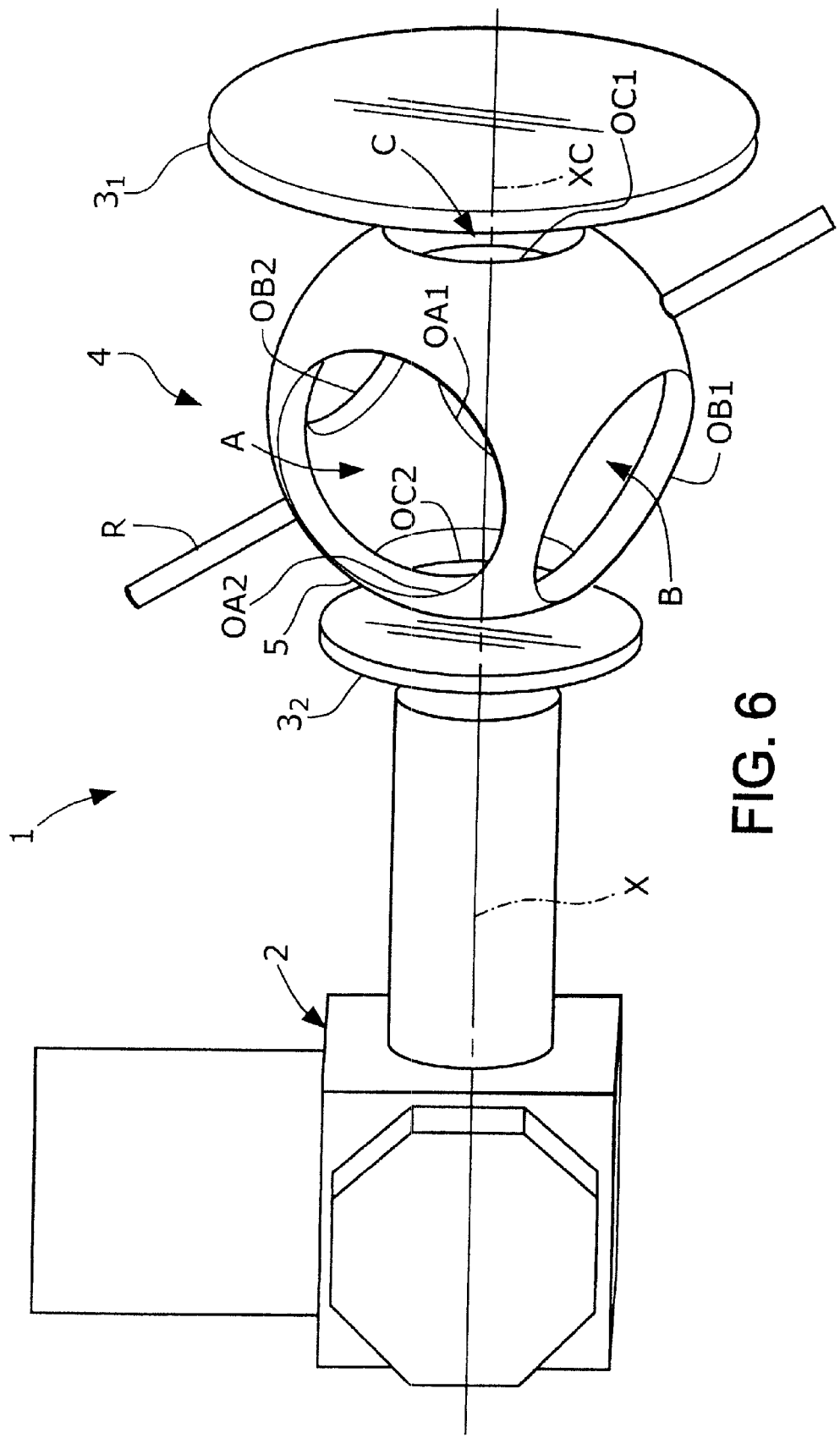

This operation is repeated for channel C, the lenses LC1, LC2 of which have, taking into account the abovementioned selection of fields, a diameter smaller than that of the lenses LB1, LB2 of channel B (FIG. 6).

Figure 7:
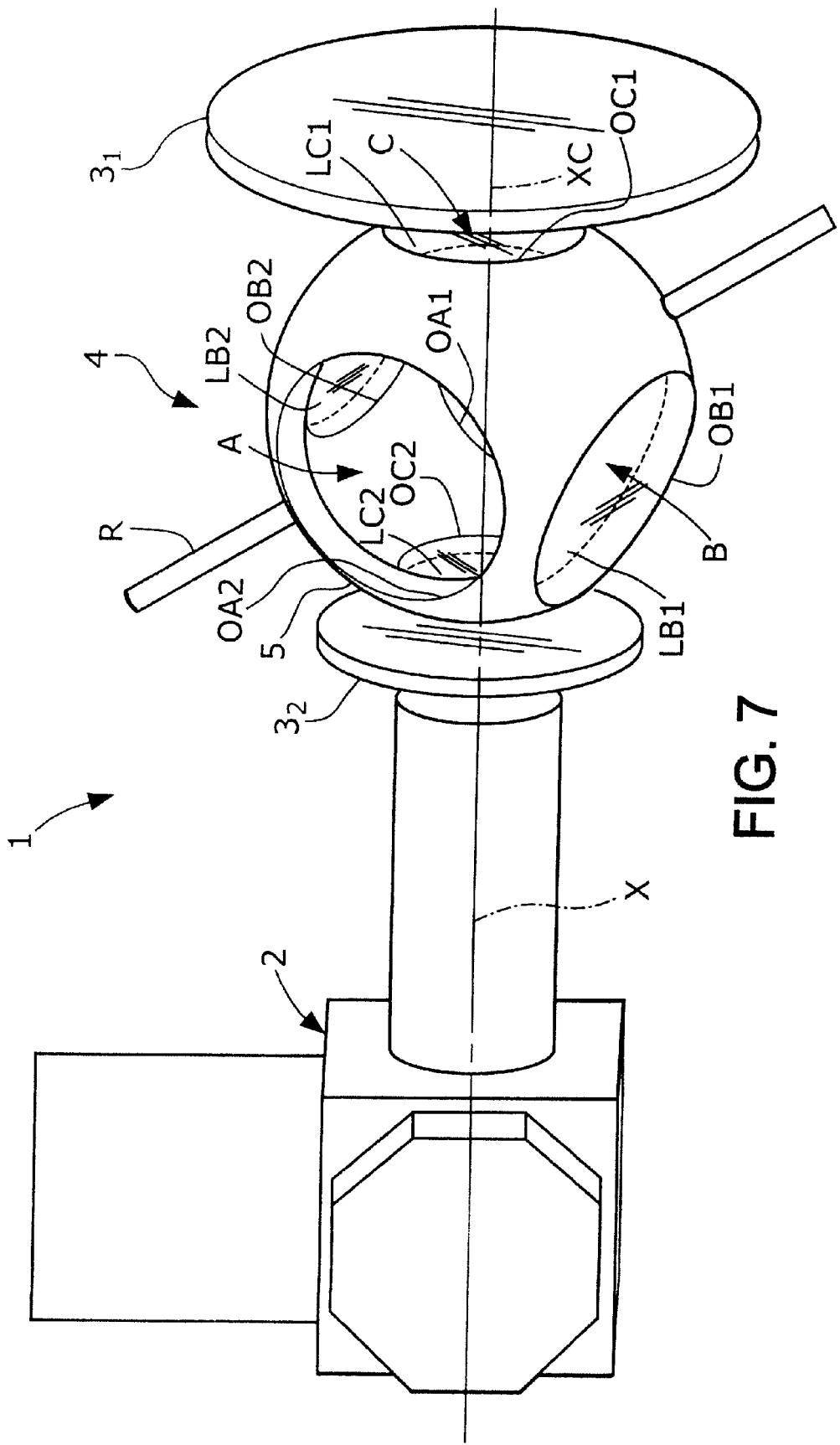

Finally, the lenses LB1, LB2, LC1, LC2 of channels B and C are mounted in their respective apertures OB1, OB2 and OC1, OC2 (FIG. 7).

The spherical shape of the magazine 5 allows its compactness to be increased - and therefore both the size and weight. The gap between the objective lens 3 and the detection module 2 is, in particular, smaller than in the known devices. Moreover, since the inertia of the magazine 5 is also lower than in the known devices, the field change is made more rapidly. Taking into account the symmetry of revolution of the magazine 5, its center of inertia may be placed more easily (by balancing) close to its rotation axis R, which is to the benefit of the stability of the optical axis of the camera 1. This is particularly appreciable in the tracking configuration.

The invention is in no way limited to the embodiment that has just been described and various modifications may be made to the changer 4 without departing from its scope.

In particular, the field values indicated above are given merely as examples. It is conceivable to choose other values, depending on the application. Likewise, the number of optical channels may exceed three. Thus, it is especially conceivable to provide a specific channel for calibrating the detection module 2.

In addition, the method of constructing the changer 4, described above, is also given as an example, particular succession of constructional steps having the simple purpose of allowing a person skilled in the art to understand the spirit in which the changer 4 is designed and of allowing him to produce it. However, as regards the manufacture of the changer 4, it goes without saying that certain steps may be reversed or may be carried out jointly.

Likewise, it was indicated that the magazine 5 is produced from a hollow sphere, this choice being made for the purpose of minimizing its weight. However, in practice, it is of course conceivable to produce the magazine 5 by drilling the apertures OA1 to OC2 in a solid sphere.

It should be noted that, for equal performance (that is to say for the same selection of optical channels), the field changer 4 according to the invention allows a weight saving of at least 25% to be made compared with the known changers.

The invention claimed is:

1. Field changer device comprising:
   a rotary magazine mounted so as to rotate about a rotation axis coincident with an axis of symmetry of the magazine, which is inclined to a fixed principal optical axis; and
   at least three optical channels provided in said magazine and having concurrent respective optical axes inclined at the same angle to the rotation axis,
   said magazine being able to rotate about its rotation axis through predetermined rotation angles in order to place each of the optical channels alternately along the principal optical axis,
   wherein the magazine is of spherical general shape and wherein the optical channels are arranged in the magazine in such a way that at least two of the rotation angles of the magazine are different.

2. The device according to claim 1, wherein at least one of the angles of the magazine is different from 120°.

3. The device according to claim 1, wherein the rotation angles are approximately 140°, 120°, 100°.

4. The device according to claim 1, wherein each optical channel comprises at least one bore produced in the magazine.

5. The device according to claim 4, wherein at least two of the optical channels comprise a lens mounted in a bore.

6. The device according to claim 4, wherein each optical channel comprises a pair of diametrically opposed bores produced in the magazine and in that at least two of the optical channels comprise a set of lenses mounted in two diametrically opposed bores, respectively.

7. The device according to claim 1, wherein the angle of inclination of the rotation axis of the magazine to the principal optical axis is between 55° and 65°.

8. The device according to claim 7, wherein the angle of inclination of the rotation axis of the magazine to the principal optical axis is 59.5°.

9. The device according to claim 1, wherein the optical channels are three in number and define a narrow field, an intermediate field and a wide field, respectively.

10. The device according to claim 9, wherein the narrow field has a value of around 0.5° to 2°, in that the intermediate field has a value of around 5° to 10° and in that the wide field has a value of around 30° to 55°.

11. The device according to claim 9, wherein the optical channels define fields with respective angular apertures of about 1°, 10° and 40°.

12. A camera comprising a front optical module, a field changer device according to claim 1, a rear optical module including a focusing element, and a detection module.

* * * * *